(12) United States Patent
Wong

(10) Patent No.: US 9,355,126 B2
(45) Date of Patent: May 31, 2016

(54) ACTIVE AUDITING IN A DATABASE SYSTEM

(75) Inventor: Daniel ManHung Wong, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1506 days.

(21) Appl. No.: 12/564,666

(22) Filed: Sep. 22, 2009

(65) Prior Publication Data

US 2011/0072030 A1    Mar. 24, 2011

(51) Int. Cl.
| | | |
|---|---|---|
| *G06F 7/00* | (2006.01) | |
| *G06F 17/00* | (2006.01) | |
| *G06F 17/30* | (2006.01) | |
| *G06F 21/55* | (2013.01) | |

(52) U.S. Cl.
CPC ........ *G06F 17/30289* (2013.01); *G06F 21/552* (2013.01); *G06F 2221/2149* (2013.01)

(58) Field of Classification Search
CPC .................................................. G06F 17/30289
USPC ................ 709/218; 713/155, 176; 312/348.6; 726/10
See application file for complete search history.

(56) References Cited

U.S. PATENT DOCUMENTS

| | | | | |
|---|---|---|---|---|
| 7,185,192 | B1 * | 2/2007 | Kahn .............................. | 713/155 |
| 7,472,170 | B2 * | 12/2008 | Zak et al. ...................... | 709/218 |
| 7,685,632 | B2 * | 3/2010 | Vayman .......................... | 726/10 |
| 7,774,604 | B2 * | 8/2010 | Lowe et al. .................... | 713/176 |
| 7,810,142 | B2 * | 10/2010 | Agrawal et al. ................... | 726/5 |
| 2007/0136237 | A1 * | 6/2007 | Barker et al. ..................... | 707/2 |
| 2008/0052308 | A1 * | 2/2008 | Zhang ............................ | 707/102 |
| 2008/0258594 | A1 * | 10/2008 | Giagni et al. ............... | 312/348.6 |
| 2009/0164492 | A1 * | 6/2009 | Cotichini et al. ............. | 707/101 |

\* cited by examiner

*Primary Examiner* — Susan Chen
(74) *Attorney, Agent, or Firm* — Shun Yao; Park, Vaughan, Fleming & Dowler LLP

(57) ABSTRACT

An auditing system receives a set of audit rules from a database administrator, which define a search criteria used to identify a database object that is desired to be audited. The auditing system uses the audit rules to search through a database to identify a corresponding set of database objects that satisfy at least one of the set of audit rules. Then, the system generates audit commands that configure a database management system to audit the identified set of database objects.

21 Claims, 8 Drawing Sheets

ACTIVE AUDITING IN A DATABASE SYSTEM

BACKGROUND

1. Field of the Invention

This disclosure is generally related to database systems. More specifically, this disclosure is related to methods and apparatus that generate audit commands for auditing database objects.

2. Related Art

Database and information systems are an important factor in the operation of most businesses. It is critical that database administrators employ effective database security measures that safeguard these systems against unintended misuse and malicious attacks. As a part of these security measures, database administrators typically monitor how information is being accessed on the database by auditing the commands that are performed on a given database object. Specifically, these database administrators create audit commands that trigger an audit for specific database objects, and cause access operations on these database objects to be recorded in an audit trail.

Unfortunately, an audit command needs to be generated for each database object that is to be audited. To make matters worse, the amount of information stored on a database continues to grow as disk storage devices grow in capacity, and organizations find new ways of using this storage capacity. Therefore, it is becoming increasingly difficult for database administrators to correctly identify and audit the growing number of objects stored in a database.

For example, if a company desires to audit all database access operations associated with a given project, database administrators face the daunting task of having to identify all database objects associated with this given project, and then having to generate an explicit set of audit commands that are directed to auditing the complete set of identified database objects.

For these reasons, typical database auditing tools are not sufficiently equipped to help database administrators audit large database systems.

SUMMARY

One embodiment of the present invention provides an auditing system that automatically audits database objects in a database. During operation, the system receives a set of audit rules, wherein an audit rule defines search criteria used to identify a database object that is desired to be audited. The system then searches through a set of database objects in the database to identify one or more database objects which satisfy the set of audit rules. The system further generates an audit command for auditing the identified database object without receiving a user audit command that explicitly specifies the identified database object.

In a variation on this embodiment, while searching through the database to identify one or more database objects which satisfy the set of audit rules, the system determines that a database object satisfies one or more audit rules in the set of audit rules and returns the database object.

In a variation on this embodiment, when the identified database object is updated, the system determines that the identified database object does not satisfy the set of audit rules and removes the audit command.

In a variation on this embodiment, when the identified database object is deleted, the system removes the audit command.

In a variation on this embodiment, when a database object is created in the database, the system determines that the newly created database object satisfies the set of audit rules and generates a second audit command for auditing the second database object.

In a variation on this embodiment, when a table is created in the database, the system selects a column from the table, determines that the selected column satisfies the set of audit rules, and generates a second audit command for auditing the selected column of the table.

In a further variation, the system determines whether a column of a table satisfies the set of audit rules by selecting a subset of rows from the table and determining whether one or more data elements in the subset of rows satisfy the set of audit rules.

In a variation on this embodiment, an audit rule includes one or more search criteria based at least on one or more of: a keyword; a data pattern; a data value; a data length; and a data size.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
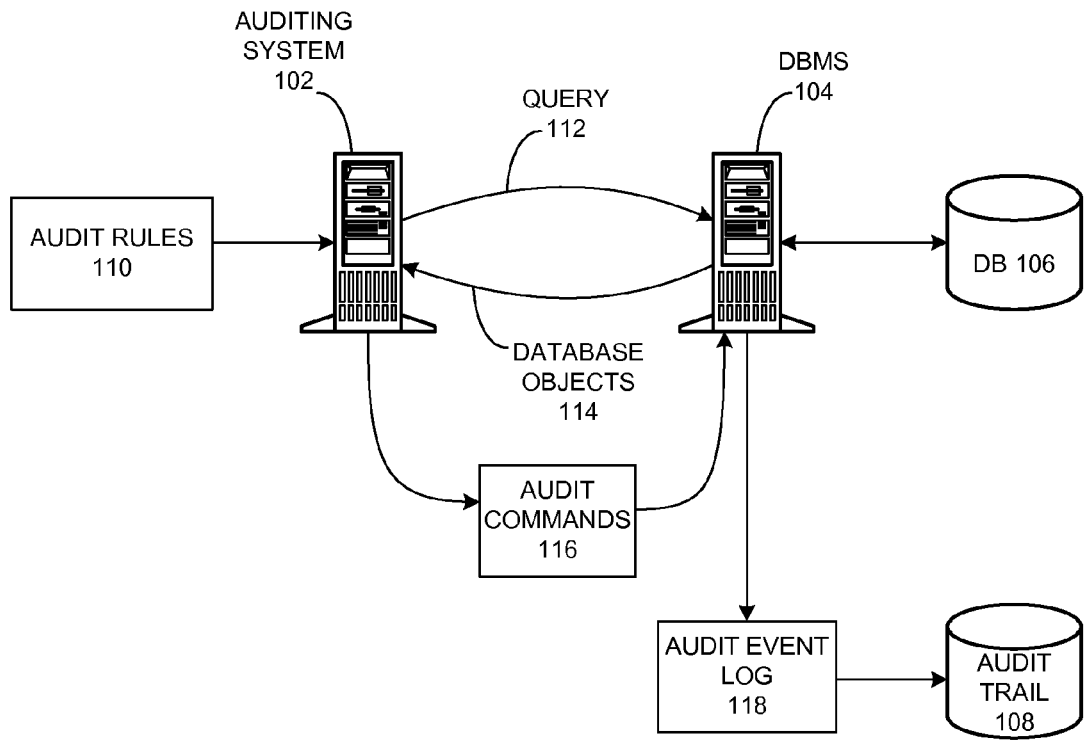
FIG. 1 illustrates an exemplary computing environment for auditing database objects in accordance with an embodiment of the present invention.

FIG. 1 illustrates an exemplary computing environment for auditing database objects in accordance with an embodiment of the present invention. The computing environment can include an auditing system 102, and a database management system (DBMS) 104. Furthermore, a database 106 and an audit trail 108 can be stored in stand-alone storage devices, or within DBMS 104.

During operation, database management system (DBMS) 104 receives commands from a user, and executes these commands to perform operations on database 106. Furthermore, a database administrator is typically responsible for implementing a security policy that prevents a user from executing operations on DBMS 104 that are restricted from the user.

It is possible that a user may, either intentionally or unintentionally, cause DBMS 104 to perform a restricted operation on database 106. Therefore, a database administrator typically complements a security policy with a corresponding audit policy that monitors database 106 to detect any restricted or questionable database access operations.

Auditing system 102 simplifies the process of implementing an audit policy by receiving a set of audit rules 110 as input, and generating a corresponding set of audit commands 116 that implement the audit policy on DBMS 104. Specifically, a database administrator can implement audit rules 110, which define a search criteria used to identify a set of objects in database 106 that are desired to be audited. Auditing system 102 issues a search query 112 to DBMS 104 based in part on audit rules 110, and receives from DBMS 104 a list of database objects 114 that satisfy the search criteria in audit rules 110. Auditing system 102 then generates audit commands 116 that configure DBMS 104 to audit database objects 114 in database 106.

DBMS 104 executes audit commands 116 to audit database objects 114 in database 106, and generates an audit event log 118 when a database operation is performed on at least one of database objects 114. An audit event log typically identifies at least one of: a database object, a database operation which has been performed on the database object, a time instance at which the operation was performed, a user account that initiated the database operation, and a client computer used to initiate the database operation. Furthermore, a sequence of audit event logs can be stored in a database to build audit trail 108.

In some embodiments, an audit rule can include dynamic search criteria that identify a desired database object based in part on a description of the object, as opposed to a typical audit system that targets specific object instances. For example, an audit rule can be used to identify a database object to audit based in part on one or more search criteria, such as: a keyword; a data pattern; a data value; a data length; and a data size. Therefore, a well-defined set of audit rules can facilitate identifying a complete set of objects in a database that need to be audited, even as database objects are created, modified, and deleted over time.

Figure 2:
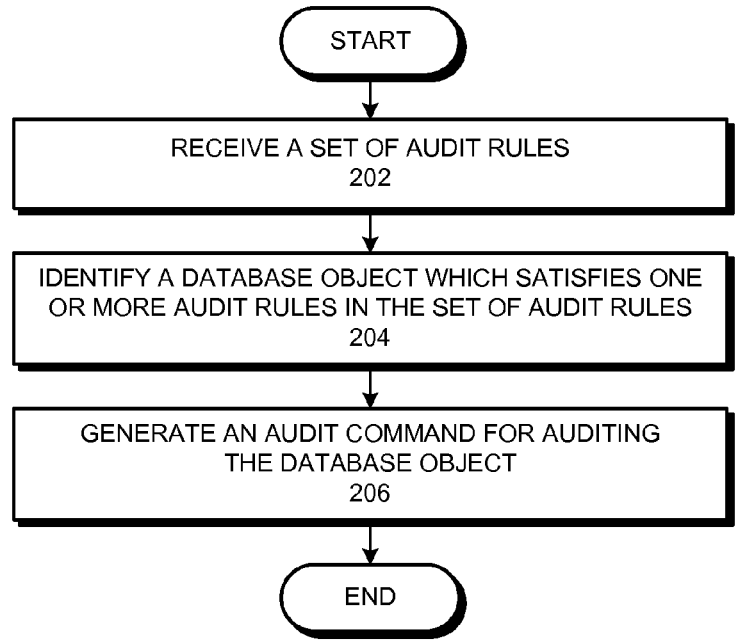
FIG. 2 presents a flow chart illustrating a process for generating an audit command for auditing a database object in accordance with an embodiment of the present invention.

FIG. 2 presents a flow chart illustrating a process for generating an audit command for auditing a database object in accordance with an embodiment of the present invention. The process can be performed by a computer system which stores instructions and executes these instructions using a processing unit such as a microprocessor. The system can begin by receiving a set of audit rules (operation 202). Next, the system identifies a database object which satisfies one or more rules in the set of audit rules (operation 204). The system then generates an audit command for auditing the identified database object (operation 206).

In some embodiments, a database management system uses the audit command to audit one or more database objects. Then, when a user attempts to perform a database operation on an audited database object, the database management system can generate an audit event log which describes details for the operations performed on the audited database object.

Figure 3:
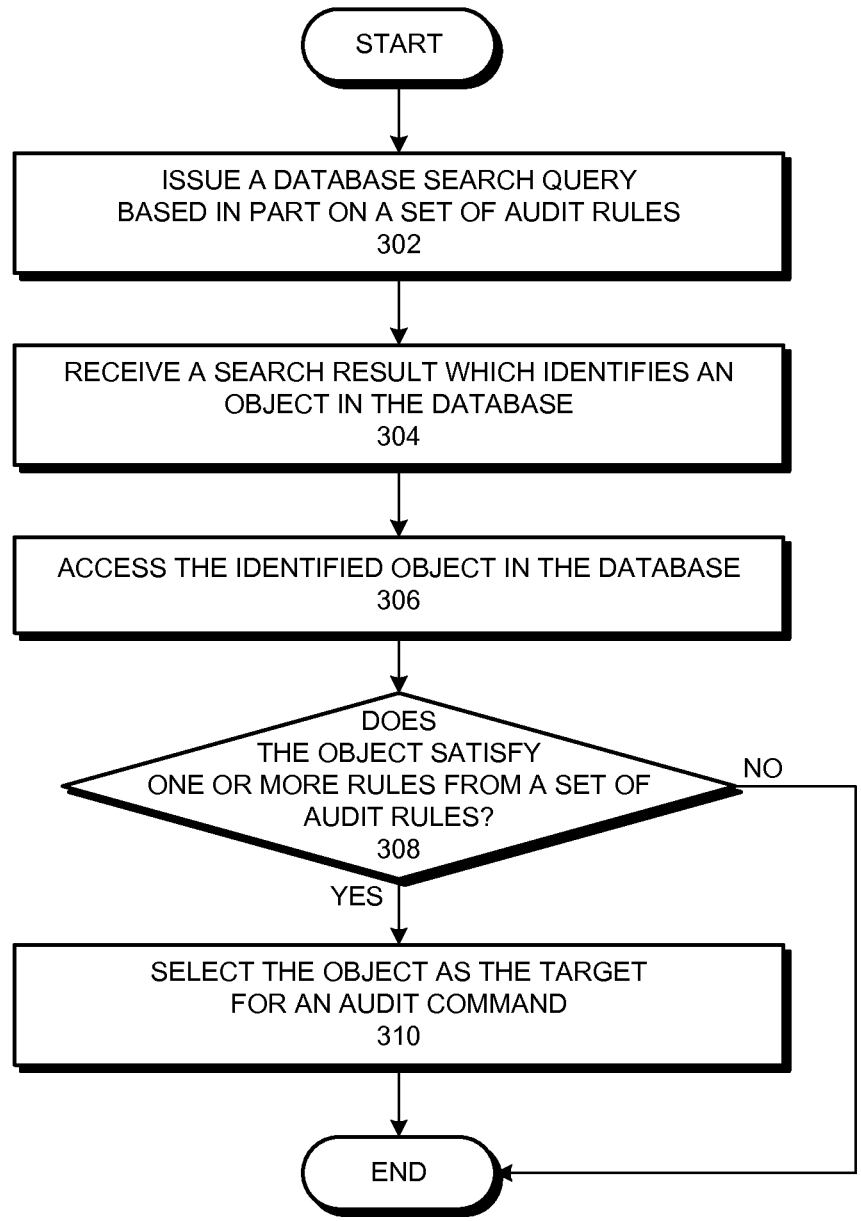
FIG. 3 presents a flowchart illustrating a process for identifying a database object which satisfies one or more rules in a set of audit rules in accordance with an embodiment of the present invention.

FIG. 3 presents a flowchart illustrating a process for identifying a database object which satisfies one or more rules in a set of audit rules in accordance with an embodiment of the present invention. Note that in some embodiments, operations 302-310 expand upon operation 204 of FIG. 2. The system can begin by issuing a database search query to a database management system based in part on a set of audit rules (operation 302). The search query includes search criteria that target one or more desired database objects. In response to receiving the search query, the database management system searches through the database to identify a set of objects in the database which satisfy the search criteria.

Next, the system receives a search result, from the database management system, which identifies an object in the database (operation 304), and accesses the identified object in the database (operation 306). The system then determines whether the object satisfies one or more rules from a set of audit rules (operation 308). If the database object does satisfy one or more audit rules, the system selects the database object as the target for an audit command (operation 310).

Note that the object data and object instances in a database can change over time. This poses a challenge for typical audit systems, as changes in a database may require a database administrator to modify a set of audit commands to handle these changes. In some embodiments of the present invention, the dynamic nature of an audit rule allows a database auditing system to naturally handle any changes to a database. Specifically, because an audit rule identifies a database object that needs to be audited based in part on a description of the database object, it is possible to maintain an up-to-date set of audit database objects over time by applying the set of audit rules to a database object that is created, modified, or deleted. For example, a database auditing system can use an existing audit rule at some future time to identify a database object to audit when the object is created or modified. Furthermore, the database auditing system can remove an audit command for a database object that no longer satisfies an audit rule when the object is modified or deleted at some future time.

Figure 4:
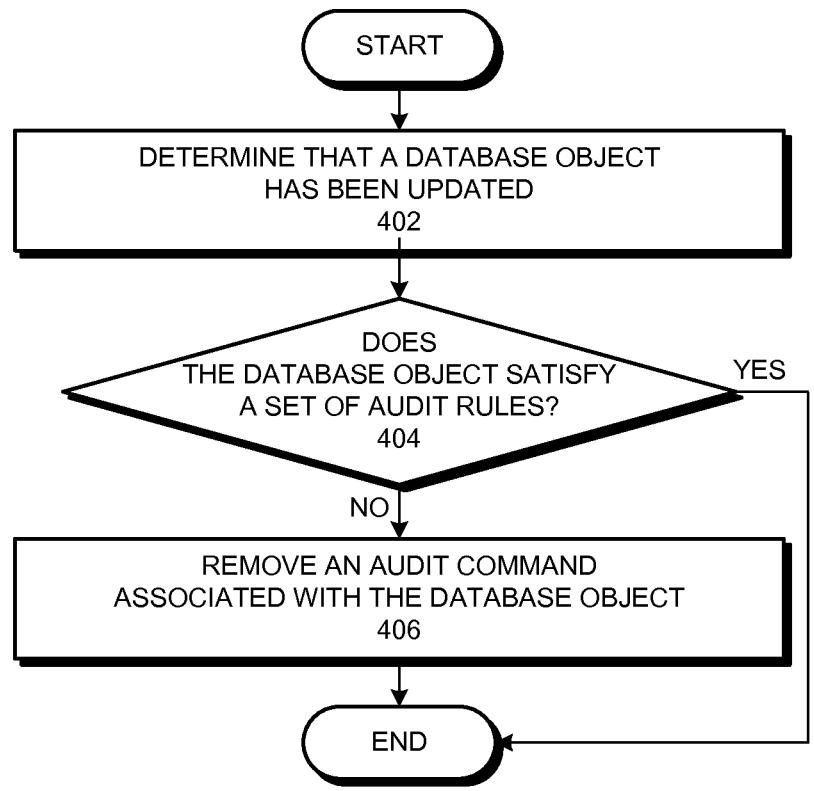
FIG. 4 presents a flowchart illustrating a process for updating a set of audit commands in response to determining that a database object has been updated in accordance with an embodiment of the present invention.

FIG. 4 presents a flowchart illustrating a process for updating a set of audit commands in response to determining that a database object has been updated in accordance with an embodiment of the present invention. The system can begin by determining that a database object has been updated (operation 402), and then determining whether the database object satisfies a set of audit rules (operation 404). If the system determines that the updated database object does not satisfy any of the rules in the set of audit rules, the system removes audit commands associated with the updated database object (operation 406).

Figure 5:
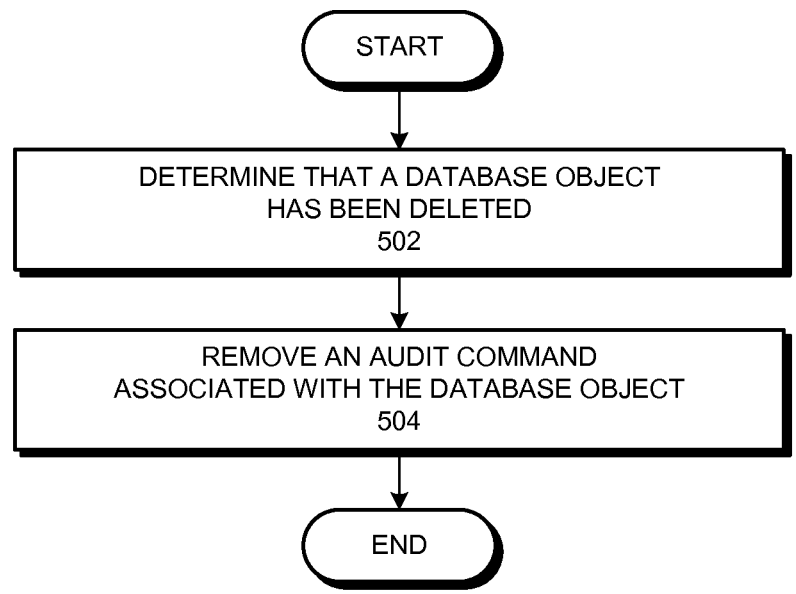
FIG. 5 presents a flowchart illustrating a process for updating a set of audit commands in response to determining that a database object has been deleted in accordance with an embodiment of the present invention.

FIG. 5 presents a flowchart illustrating a process for updating a set of audit commands in response to determining that a database object has been deleted in accordance with an embodiment of the present invention. The system can begin by determining that a database object has been deleted (operation 502). Then, in response to the database object having been deleted, the system removes any audit commands associated with the deleted database object (operation 504).

Figure 6:
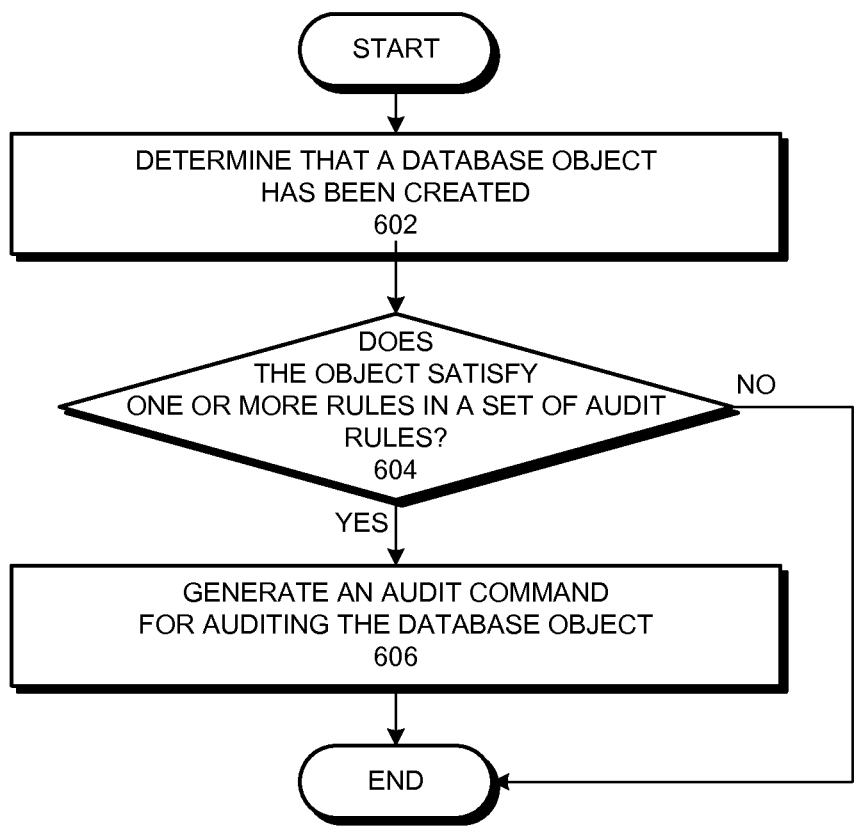
FIG. 6 presents a flowchart illustrating a process for updating a set of audit commands in response to determining that a database object has been created in accordance with an embodiment of the present invention.

FIG. 6 presents a flowchart illustrating a process for updating a set of audit commands in response to determining that a database object has been created in accordance with an embodiment of the present invention. The system can begin by determining that a database object has been created (operation 602), and then determining whether the database object satisfies one or more rules in a set of audit rules (operation 604). If the system determines that the updated database object satisfies at least one rule in the set of audit rules, the system generates an audit command for auditing the database object (operation 606).

A database table is typically used to group a set of data elements into one database object. The columns of a table correspond to a set of data elements, and a row of the table represents a set of values that correspond to the set of column elements. Therefore, because a column of a table corresponds to a data element (e.g., a user name, a database parameter, etc.), it may be necessary for an auditing system to issue an audit command that is specific to a column of a database table.

Figure 7:
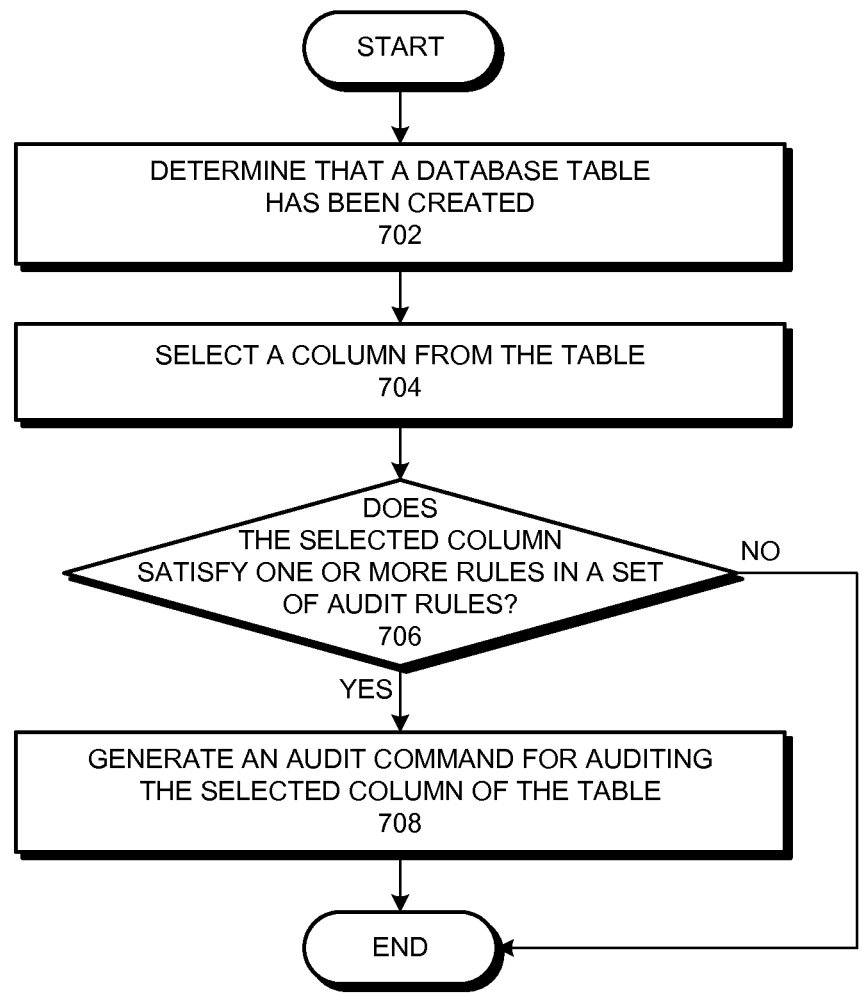
FIG. 7 presents a flowchart illustrating a process for updating a set of audit commands in response to determining that a database table has been created in accordance with an embodiment of the present invention.

FIG. 7 presents a flowchart illustrating a process for updating a set of audit commands in response to determining that a database table has been created in accordance with an embodiment of the present invention. The system can begin by determining that a database table has been created (operation 702), and selecting a column of the database table (operation 704). Then, the system determines whether the selected column satisfies one or more rules in a set of audit rules (operation 706). If the system determines that the selected column of the database table satisfies at least one rule in the set of audit rules, the system generates an audit command for auditing the selected column of the table (operation 708).

Recall that a row of a datable table provides a set of values for the columns in the table. In some embodiments, an audit rule may include a search criteria based in part on the data values in a table. Therefore, to determine whether a specific column of a table satisfies the audit rule, the auditing system may need to sample at least a subset of the rows for the column.

Figure 8:
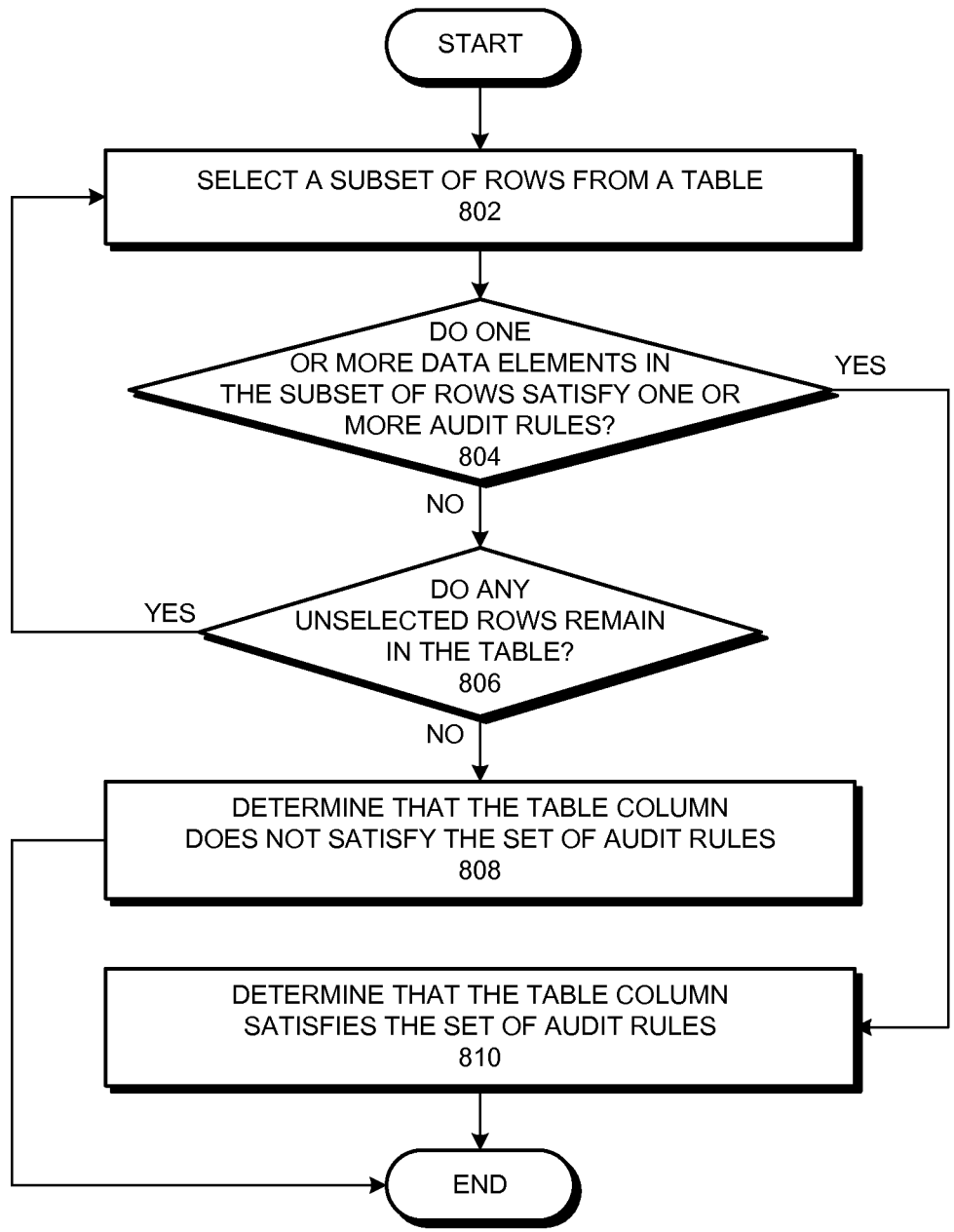
FIG. 8 presents a flowchart illustrating a process for determining whether a column of a database table satisfies a set of audit rules in accordance with an embodiment of the present invention.

FIG. 8 presents a flowchart illustrating a process for determining whether a column of a database table satisfies a set of audit rules in accordance with an embodiment of the present invention. The system can begin by selecting a subset of rows from the table (operation 802). Then, the system determines whether one or more elements in the subset of rows satisfy one or more rules in the set of audit rules (operation 804). If at least one element in the subset of rows satisfies at least one rule in the set of audit rules, the system determines that the column satisfies the set of audit rules (operation 810), and the process ends.

Otherwise, if operation 804 determines that none of the elements in the selected subset of rows satisfies any of the rules in the set of audit rules, and operation 806 determines that unselected rows remain in the table, the system returns to operation 802 to select a new subset of rows from the table which have not yet been considered.

Otherwise, if none of the elements in any row of the table satisfies any of the rules in the set of audit rules (i.e., operations 804 and 806 both result in "NO"), the system determines that the column of the table does not satisfy the set of audit rules (operation 808).

Figure 9:
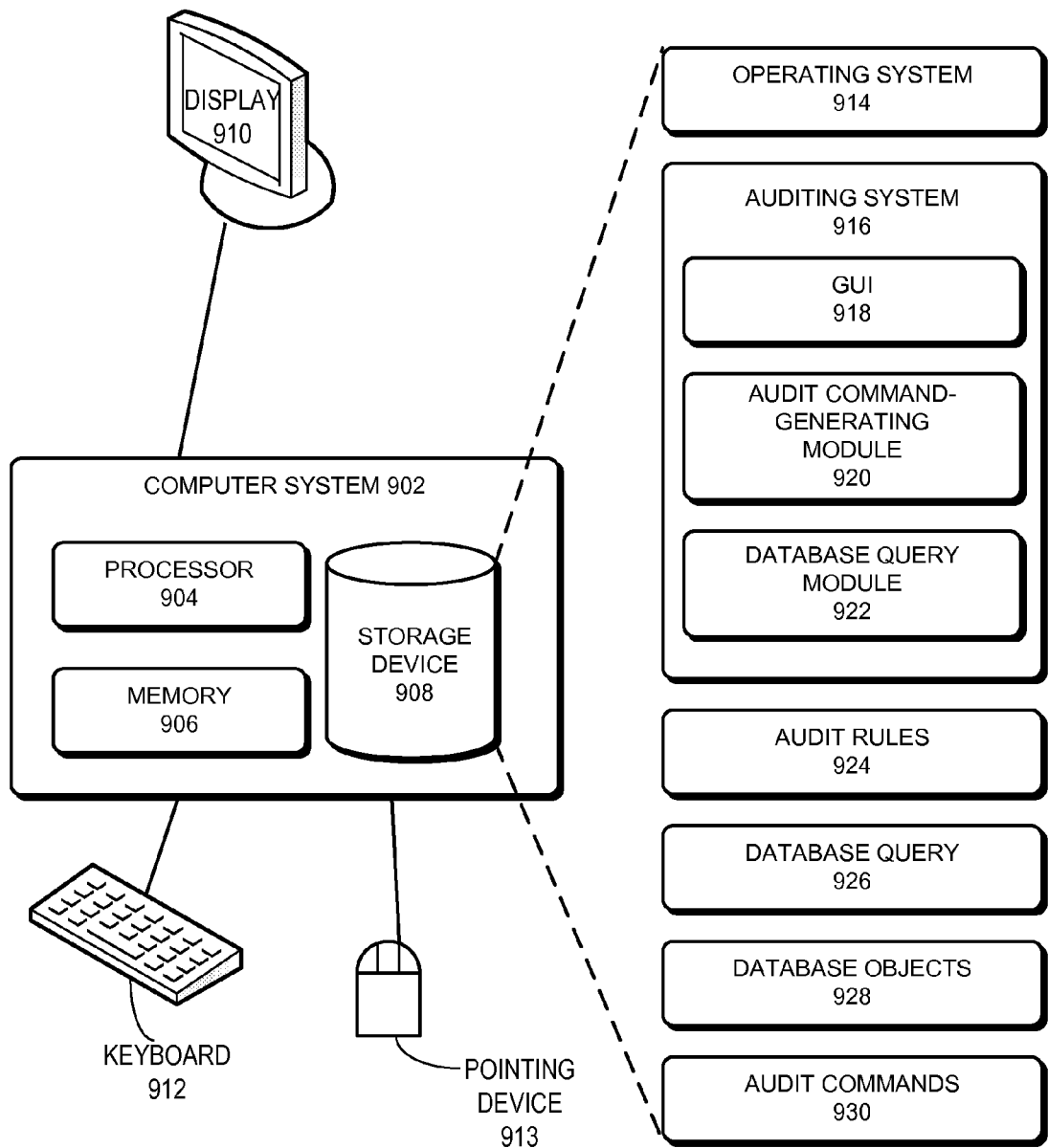
FIG. 9 illustrates an exemplary database auditing system that facilitates auditing a database object in accordance with an embodiment of the present invention.

FIG. 9 illustrates an exemplary database auditing system that facilitates auditing a database object in accordance with an embodiment of the present invention. Computer system 902 includes a processor 904, a memory 906, and a storage device 908. Furthermore, computer system 902 can be coupled to a display device 910, a keyboard 912, and/or a pointing device 913.

Storage device 908 stores at least one of an operating system 914, a targeted advertising system 916, audit rules 924, a database query 926, a database object 928, and an audit command 930. Furthermore, auditing system 916 can include a graphical user interface (GUI) 918, an audit command-generating module 920, and a database query module 922.

During operation, computer system 902 loads auditing system 916 from storage device 908 into memory 906, and executes auditing system 916 on processor 904. Auditing system 916 can receive audit rules 924 from a database administrator, and database query module 922 issues a database query 926 to a database management system based in part on audit rules 924. Then, in response to issuing database query 926, database query module 922 receives a set of database objects 928 that satisfy one or more of audit rules 924. Audit command-generating module 920 can then generate a corresponding set of audit commands 930 that configure the database management system to audit database objects 928.

Figure 10:
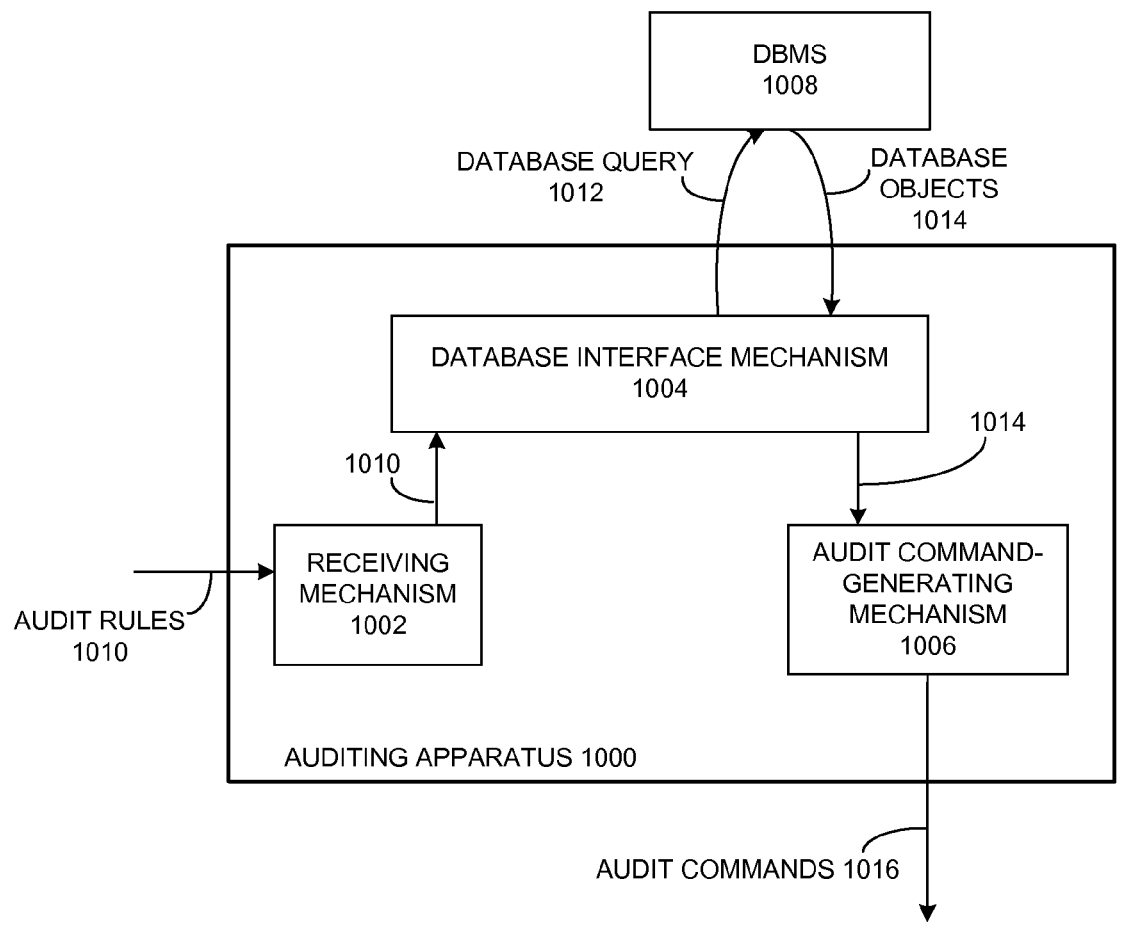
FIG. 10 illustrates an exemplary apparatus that facilitates auditing a database object in accordance with an embodiment of the present invention.

FIG. 10 illustrates an exemplary apparatus that facilitates auditing a database object in accordance with an embodiment of the present invention. Apparatus 1000 can comprise a number of mechanisms which may communicate with one another via a wired or wireless communication channel. Apparatus 1000 may be realized using one or more integrated circuits, and it may be integrated in a computer system, or it may be realized as a separate device which is capable of communicating with other computer systems and/or devices. Specifically, auditing apparatus 1000 can include a receiving mechanism 1002, a database interface mechanism 1004, and an audit command-generating mechanism 1006.

During operation, receiving mechanism 1002 can receive audit rules 1010 from a database administrator, and database interface mechanism 1004 issues a database query 1012 to a database management system 1008 based in part on audit rules 1010. Then, in response to issuing database query 1012, database interface mechanism 1004 receives a set of database objects 1014 that satisfy one or more of audit rules 1010. Audit command-generating mechanism 1006 can then generate a corresponding set of audit commands 1016 that configure database management system 1008 to audit database objects 1014.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automatically auditing database objects in a database, comprising:
   receiving a set of audit rules, wherein an audit rule defines search criteria used to identify a database object that is desired to be audited;
   searching through a set of database objects in the database to identify one or more database objects which satisfy the set of audit rules;
   generating an audit command for auditing an identified database object that satisfies the set of audit rules, without receiving a user audit command that explicitly specifies the identified database object; and
   in response to determining that the identified database object is updated:
      determining that the identified database object does not satisfy the set of audit rules; and
      removing the audit command.

2. The computer-implemented method of claim 1, wherein searching through the database to identify one or more database objects which satisfy the set of audit rules comprises:
   determining that a database object satisfies one or more audit rules in the set of audit rules; and
   returning the database object.

3. The computer-implemented method of claim 1, wherein when the identified database object is deleted, the method further comprises removing the audit command.

4. The computer-implemented method of claim 1, wherein when a database object is created in the database, the method further comprises:
   determining that the newly created database object satisfies the set of audit rules; and
   generating a second audit command for auditing the second database object.

5. The computer-implemented method of claim 1, wherein when a table is created in the database, the method further comprises:
   selecting a column from the table;
   determining that the selected column satisfies the set of audit rules; and
   generating a second audit command for auditing the selected column of the table.

6. The computer-implemented method of claim 5, further comprising determining whether a column of a table satisfies the set of audit rules by:
   selecting a subset of rows from the table; and
   determining whether one or more data elements in the subset of rows satisfy the set of audit rules.

7. The computer-implemented method of claim 1, wherein an audit rule includes one or more search criteria based at least on one or more of: a keyword; a data pattern; a data value; a data length; and a data size.

8. A non-transitory computer-readable storage medium storing instructions that when executed by a computer cause the computer to perform a method for automatically auditing database objects in a database, the method comprising:
   receiving a set of audit rules, wherein an audit rule defines search criteria used to identify a database object that is desired to be audited;
   searching through a set of database objects in the database to identify one or more database objects which satisfy the set of audit rules;
   generating an audit command for auditing an identified database object that satisfies the set of audit rules, without receiving a user audit command that explicitly specifies the identified database object; and
   in response to determining that the identified database object is updated:
      determining that the identified database object does not satisfy the set of audit rules; and
      removing the audit command.

9. The non-transitory computer-readable storage medium of claim 8, wherein searching through the database to identify one or more databases object which satisfy the set of audit rules comprises:
   determining that a database object satisfies one or more audit rules in the set of audit rules; and
   returning the database object.

10. The non-transitory computer-readable storage medium of claim 8, wherein when the identified database object is deleted, the method further comprises removing the audit command.

11. The non-transitory computer-readable storage medium of claim 8, wherein when a database object is created in the database, the method further comprises:
   determining that the newly created database object satisfies the set of audit rules; and
   generating a second audit command for auditing the second database object.

12. The non-transitory computer-readable storage medium of claim 8, wherein when a table is created in the database, the method further comprises:
   selecting a column from the table;
   determining that the selected column satisfies the set of audit rules; and
   generating a second audit command for auditing the selected column of the table.

13. The non-transitory computer-readable storage medium of claim 12, wherein the method further comprises determining whether a column of a table satisfies the set of audit rules by:
   selecting a subset of rows from the table; and
   determining whether one or more data elements in the subset of rows satisfy the set of audit rules.

14. The non-transitory computer-readable storage medium of claim 8, wherein an audit rule includes one or more search criteria based at least on one or more of: a keyword; a data pattern; a data value; a data length; and a data size.

15. An apparatus for automatically auditing database objects in a database, comprising:
   a processor;
   a memory;
   a receiving mechanism configured to receive a set of audit rules, wherein an audit rule defines a search criteria used to identify a database object that is desired to be audited;
   a database interface mechanism configured to search through a set of database objects in the database to identify one or more database objects which satisfy the set of audit rules; and
   an audit command-generating mechanism configured to generate an audit command for auditing an identified database object that satisfies the set of audit rules, without receiving a user audit command that explicitly specifies the identified database object;

wherein when the identified database object is updated, the audit command-generating mechanism is further configured to:
   determine that the identified database object does not satisfy the set of audit rules; and
   remove the audit command.

16. The apparatus of claim 15, wherein while searching through the database to identify one or more database objects which satisfies the set of audit rules, the database interface mechanism is configured to:
   determine that the database object satisfies one or more audit rules in the set of audit rules; and
   return the database object.

17. The apparatus of claim 15, wherein when the identified database object is deleted, the audit command-generating mechanism is further configured to remove the audit command.

18. The apparatus of claim 15, wherein when a database object is created in the database, the audit command-generating mechanism is further configured to:
   determine that the newly created database object satisfies the set of audit rules; and
   generate a second audit command for auditing the second database object.

19. The apparatus of claim 15, wherein when a table is created in the database, the audit command-generating mechanism is further configured to:
   select a column from the table;
   determine that the selected column satisfies the set of audit rules; and
   generate a second audit command for auditing the selected column of the table.

20. The apparatus of claim 19, wherein while determining whether a column of a table satisfies the set of audit rules, the audit command generating mechanism is further configured to:
   select a subset of rows from the table; and
   determine whether one or more data elements in the subset of rows satisfy the set of audit rules.

21. The apparatus of claim 15, wherein an audit rule includes one or more search criteria based at least on one or more of: a keyword; a data pattern; a data value; a data length; and a data size.

* * * * *